United States Patent [19]

Heinzl

[11] 4,215,238

[45] Jul. 29, 1980

[54] METHOD OF AND APPARATUS FOR PRINTED CHARACTER TRANSMISSION AND RECEPTION

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 942,915

[22] Filed: Sep. 18, 1978

[30] Foreign Application Priority Data

Oct. 27, 1977 [DE] Fed. Rep. of Germany ....... 2748218

[51] Int. Cl.$^2$ .................... B41J 5/00; G06K 15/02; H04L 15/24
[52] U.S. Cl. ................................ 178/23 R; 178/30; 400/111
[58] Field of Search ............... 178/23 R, 25, 26 R, 178/26 A, 30, 17.5; 400/111, 109; 340/324 A, 324 AD

[56] References Cited

U.S. PATENT DOCUMENTS 4,137,425  1/1979  Ferroglio et al. ................. 178/23 R

OTHER PUBLICATIONS

"Portable Printing and Plotting", Electronics, Mar. 3, 1977, p. 54.
"Israeli Teleprinter Switches Easily Between Two Different Alphabets", Electronics, May 12, 1977, pp. 33-34.
"Schreibstation PT80", Siemens-Zeitschrift 51, Heft (i.e., number) 4, 1977, pp. 215-218.

*Primary Examiner*—Thomas A. Robinson
*Attorney, Agent, or Firm*—Hill, Van Santen, Steadman, Chiara & Simpson

[57] ABSTRACT

Printed characters are transmitted by storing data words in a transmitter representing character sequences for operating a printing head in accordance with a first mode, producing in the transmitter code words different from data words representing the character sequences and transmitting messages including the code words to a receiver which has a printing head which can operate selectively in accordance with the first mode or a second mode. A printing head provided with at least one printing element at the receiving station is supplied with binary character sequences which trigger printing commands. A character generator is provided which stores the binary character sequences of predetermined characters and, following the reception of data words assigned to the characters, emits the appropriate binary character sequences. In the transmission of characters whose binary character sequences are stored in a character generator in the transmitting station and which at least partially differ from those characters whose binary character sequences are stored in the character generator of the receiving station, the binary character sequences are read from the character generator in the transmitting station and are converted into code words which are transmitted in place of the data words to the receiving station. In the receiving station the received code words are reconverted into binary character sequences which are fed to the printing head by-passing the character generator in the receiving station.

12 Claims, 1 Drawing Figure

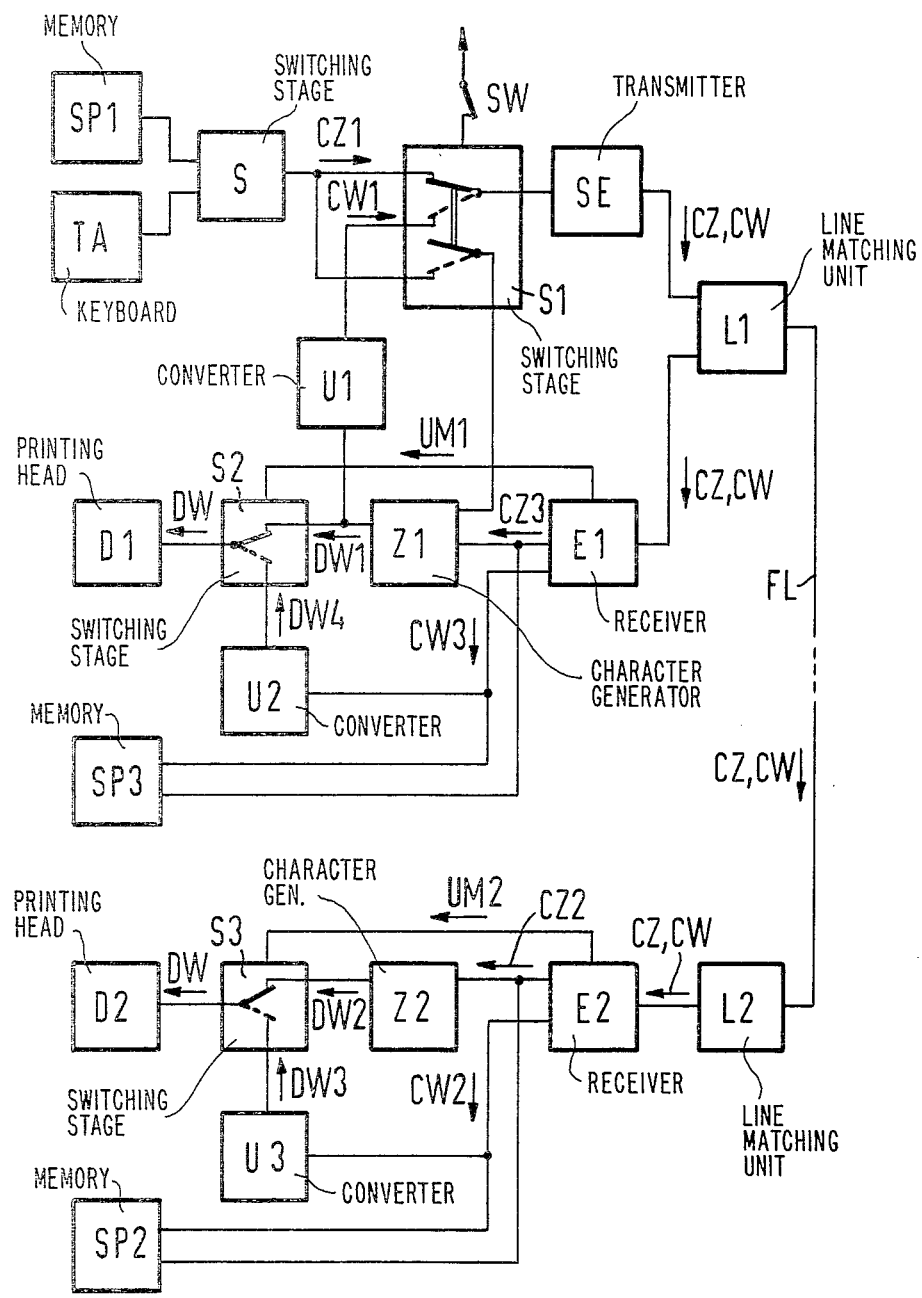

METHOD OF AND APPARATUS FOR PRINTED CHARACTER TRANSMISSION AND RECEPTION

CROSS REFERENCE TO RELATED APPLICATION

This application is related to my application entitled "A Process And Arrangement For Selectively Transmitting Predetermined Characters Or Graphic Patterns", Ser. No. 942,928, filed on even date herewith.

BACKGROUND OF THE INVENTION

1. Field of the Invention

The present invention relates to a method of and apparatus for printed character transmission and reception.

2. Description of the Prior Art

In a teleprinter system or data printer system, alphanumeric characters and symbols are transmitted by means of data words from a transmitting station to a receiving station. When the characters are selected by way of a keyboard or by way of a memory, the data words are subsequently produced in the transmitting station. In the receiving station, the data words are fed to a printing device which prints out the appropriate characters.

In a printing station disclosed in an article by B. Peukert and H. Senger, Schreibstation PT 80, Siemens-Zeitschrift 51, 1977, Vol. 4, pp. 215-218, in the receiving station each character is represented by a mosaic printing head as a predetermined pattern of matrix points. The mosaic printing head consists either of a needle printing head comprising a plurality of printer needles driven by moving coils, or an ink printing head comprising a plurality of nozzles controlled by piezoceramics. The characters are represented, for example, in a matrix pattern of 12×9 points. The mosaic printing head contains twelve printing elements (needles or nozzles) and the characters are represented in nine feed steps. The printing head is supplied with binary character sequences which represent respective predetermined characters and which are stored in a character generator. For example, each character sequence contains as many binary characters as printing head elements are provided, and the binary values of the binary characters indicate whether or not the corresponding printing element is to be actuated.

However, the known teleprinters or data printers can only be used to print out the characters stored in the character generator. If, for example, the character generator stores only characters corresponding to a standard text, for example a particular language such as German, it is impossible to use the teleprinter or data printer to print out characters in another language, such as an Arabic or Cyrillic text.

SUMMARY OF THE INVENTION

It is therefore the object of the present invention to provide a method of and apparatus for transmitting and receiving characters in which additional characters may be utilized to cause the printer to operate in one mode, for example in one language, or to cause the printer to operate in another mode, for example in another language.

According to a first feature of the invention, there is provided a method of printed character transmission which includes the steps of storing data words in a transmitter representing character sequences for operating a printing head in accordance with a first mode, producing in the transmitter code words different from these data words and representing the character sequences and transmitting messages including the code words to a receiver which has a printing head which can operate selectively in accordance with a second mode or with the first mode.

According to a second feature of the invention, the method of printed character reception includes the steps of storing a first set of character sequences for operating a printing head in accordance with a second mode, receiving messages including code words representing a second set of character sequences different from the first set of character sequences and for operating a printing head in accordance with a first mode and using the code words to operate a printing head in accordance with the first mode.

According to a third feature of the invention, the apparatus for printed character transmission includes means for storing data words representing a first set of character sequences for operating a printing head in accordance with a first mode, means for producing code words representing a second set of character sequences different from the first set of character sequences and for operating a printing head in accordance with a second mode, and means for transmitting messages including such code words.

According to another feature of the invention an apparatus for printed character reception includes means for storing a first set of character sequences for operating a printing head in accordance with a first mode, means for receiving messages including code words representing a second set of character sequences different from the first set of character sequences and for operating a printing head in accordance with a second mode, and means for using the code words to operate a printing head of the apparatus in accordance with the second mode.

In embodiments of the invention transmission of characters in an Arabic or Cyrillic text can be effected to a receiving station which contains a character generator for standard German text, for example. In this case, the receiving station is not supplied with the data words which call up the characters of the standard German text, but the transmitting station emits code words which are directly representative of the form of the characters. A teleprinter station which is installed in a German speaking area and whose character generator contains the characters of standard German text can thus, on the one hand, receive and emit teleprinter messages the characters of which are called up by the data words in the character generator, and, on the other hand, can receive and emit teleprinter messages, for example in Arabic text, from a transmitting station in an Arabic land by means of code words which are produced with the aid of the character generator in the transmitting station.

Embodiments can be employed with advantage when the characters stored in the character generator of the transmitting station and the characters stored in the character generator of the receiving station belong to different alphabets.

If the transmission path between the transmitting and receiving stations consists of known teleprinter or data networks, it is advantageous for the data words and the code words to possess the format of teleprinter characters. In particular, it is advantageous for the teleprinter characters to be coded in accordance with the format of teleprinter characters belonging to the CCITT Code No. 5.

If the character sequences are binary and the printing head in the receiving station has more printing elements than there are binary characters in the code word, it is expedient for each transmitted code word to represent at least a part of each binary character sequence supplied to the printing head. In other words, respective groups of code words may comprise the character sequences. Alternatively, the code words may comprise respective groups of character sequences.

In order to inform the receiving station whether the binary character sequences emitted from its character generator or the binary character sequences assigned to the code words are to be switched through to the printing head, it is advantageous to transmit switching signals upon the reception of which, in the receiving station, the received code words or the received data words in the receiving station are switched through to the printing head.

If the printing head in the receiving station does not move continuously, but executes a number of printing steps corresponding to the number of printing steps of a character, it is favorable for a predetermined sequence of code words to be intermediately stored in the receiving station.

In a transmission-reception system embodying the invention, a first switching stage is provided which selectively switches through to the receiving station either the data words or code words.

If binary character sequences emitted from the character generator in the transmitting station are not directly suitable for transmission as code words, it is advantageous for the printing station to contain a converter which assigns code words to the binary character sequences emitted from the character generator arranged therein and to further contain a switching stage which selectively switches through to the receiving station the data words emitted from input units, or the character sequences or the code words, and that the receiving station contains a further converter which again assigns binary character sequences to the code words and also contains a further switching stage which, in dependence upon a received transfer signal, switches through to the printing head either the binary character sequences emitted from the character generator arranged therein or the binary character sequences emitted from the further converter.

If the number of binary characters in the code words is less than the number of binary characters in the binary character sequences, or if the printing head is moved only character-by-character and executes a predetermined number of printing steps which is equal to the number of printing steps of each of the characters stored in the character generator of the receiving station, it is expedient for the further converter to contain a memory which intermediately stores as many code words as are required to produce the binary character sequences assigned to the character stored in the character generator of the receiving station.

If the received characters are not to be represented directly following reception or are to be stored for a later, additional representation, it is favorable for the receiving station to contain a further memory in which the received data words and/or code words can be stored.

BRIEF DESCRIPTION OF THE DRAWING

Other objects, features and advantages of the invention, its organization, construction and mode of operation, will be best understood from the following detailed description, taken in conjunction with the accompanying drawing, on which there is a single FIGURE which is a block circuit diagram of a portion of a printed character transmission system embodying the present invention.

DESCRIPTION OF THE PREFERRED EMBODIMENTS

Referring to the drawing, a transmitting station has transmitting and receiving devices and is connected to a receiving station which has receiving devices which are of similar construction to the receiving devices in the transmitting station.

It will first be assumed that both the transmitting station and the receiving station are installed in the same country and, in a known manner, a teleprinter message is to be transmitted from the transmitting station to the receiving station. The transmitting station and the receiving station possess the same character set, for example characters in standard German text. The characters are input, via a keyboard TA or a memory SP1 and are represented in parallel-coded form by data words CZ1. The data words CZ1 are fed by way of a switching stage S to a switching stage S1, either from the keyboard TA or from the memory SP1.

A switch SW which is connected to the switching stage S1 is closed whenever, as is assumed, characters are transmitted between stations having the same character setting. A signal emitted from the closed switch SW brings two switches in the switching stage S1 into the solid-line position and switches through the data words CZ1 to a transmitter SE. The transmitter SE converts the parallel-coded data words CZ1 into series-coded data words CZ and emits the words CZ via a line matching unit L1, to a trunk line FL.

In the receiving station the data words CZ are fed, via a line matching unit L2, to a receiver E2. The receiver E2 converts the series-coded data words CZ into parallel-coded data words CZ2 and emits the data words CZ2 to a character generator Z2.

The character generator Z2 stores binary character sequences which are supplied to a printing head D2 comprising a plurality of printing elements, for example a mosaic printing head for the representation of the characters represented by the data words CZ2. The character sequences DW2, in each case assigned to a character, are called up by the data word CZ2 and fed, via a switch in a switching stage S3, as a character sequence DW to the printing head D2. If it is desired to store the received teleprinter message, the data words CZ2 are fed to a memory SP2.

As in the receiving station, the characters can be printed out in the transmitting station for check purposes. For this purpose, and by way of the line matching unit L1, the series-coded data words CZ are supplied to a receiver E1 which emits parallel-coded data words CZ3 to a character generator Z1 and possibly also to a memory SP3. Similarly to the character generator Z2, the character generator Z1 emits character sequence DW1 as a character sequence DW via a switch in a switching stage S2 to a printing head D1.

If, as assumed, the same character set is contained in the transmitting station and in the receiving station, the data words CZ2 and CZ3 call up the character sequences DW1 and DW2 of the same characters in the character generators Z1 and Z2 and the same characters are printed out by way of the printing heads D1 and D2.

If the transmitting station is installed in a country using a different alphabet from that used as a standard in the receiving station, for example in an Arabic land, and contains a character generator Z1 for Arabic characters and a corresponding keyboard TA for Arabic characters and Arabic characters are to be transmitted to the receiving station which contains only a character generator Z2 for standard German text, in known teleprinter systems it is not possible to print out these characters in the receiving station.

In order to achieve printing in another language, in the transmitting station the switch SW is opened and the switches in the switching stage S1 assume the broken-line positions. The data words CZ1, which now represent Arabic characters, are no longer directly supplied to the transmitter SE, but rather are conducted by way of the lower switch in the switching stage S1 to the character generator Z1. The character sequences DW1 stored in the character generator Z1 are called up and emitted in response to the data words CZ1. With the aid of a converter U1 the character sequences DW1 are assigned code words CW1 which possess the same format as the data words CZ1. The code words CW1 are fed by way of the upper switch in the switching stage S1, in place of the data words CZ1, to the transmitter SE. The transmitter SE converts the parallel-coded code words CW1 into series-coded code words CW and emits the latter via the line matching unit L1 to the trunk line FL. Preceding the code words CW in the transmitted signal is a transfer signal which is produced after the opening of the switch SW. The transfer signal and the following code words CW pass, via the line matching unit L2, in the receiving station to the receiver E2.

The receiver E2 recognizes the transfer signal and emits corresponding transfer signal UM2 to the switching stage S3, and the switch in the switching stage S3 is responsive to the transfer signal UM2 to assume the broken-line position. In this configuration, the receiver E2 converts the series-coded code words CW into parallel-coded code words CW2 and emits the latter to a converter U3. The converter U3 assigns to the code words CW2, character sequences DW3 which correspond to the character sequences DW1 emitted from the character generator Z1. By way of the switching stage S3, these character sequences DW3 are switched through to the printing head D2 as character sequences DW in place of the character sequences DW2. Therefore, the printing head D2 prints out the Arabic characters although the character generator Z2 in the receiving station contains only characters in the standard German text. If the characters represented by the code words CW are also to be stored in the receiving station, the code words CW2 are supplied to the memory SP2.

In the transmitting station, the Arabic characters can be printed out since the character sequences DW1 are fed via the switching stage S2 to the printing head D1. It is also possible to supply the code words CW by way of the line matching unit L1 to the receiver E1 which converts the parallel-coded code words CW into series-coded code words CW3. A converter U2 assigns the code words CW3, character sequences DW4 which correspond to the character sequences DW1 and DW3 and, following the occurrence of a transfer signal UM1, which corresponds to the transfer signal UM2 in response to the previously inserted transfer signal, the character sequences DW4 are fed by way of the switch in the switching stage S2 to the printing head D1 where they are printed out in the same manner as by the printing head D2.

At the end of the teleprinter message composed of Arabic characters, the receiver E2 produces a further transfer signal UM2 which returns the switch in the switching stage S3 to the solid-line position. Subsequently, received teleprinter messages transmitted by means of data words CZ are therefore again printed out in the manner described above by the printing head D2 employing the character generator Z2.

If the data words CZ and the code words CW possess a format which corresponds to that of teleprinter characters coded in accordance with CCITT code No. 5, and if the printing head D2 contains eight printing elements which are simultaneously operable, then following the series-parallel conversion and following the separation of the start element and stop element of the received signal, the code words CW can be directly switched through to the printing head D2 as in this case the code words and the character sequences each consist of eight binary characters. Within the code words CW, which then correspond to the character sequences DW, each binary character having the binary value "1" indicates a printing element which is to be actuated.

If the printing head D1 or D2 is not moved continuously during the reproduction of the characters, but is only displaced character-by-character, and the number of steps in the representation of a character in the transmitting station and in the receiving station differ, it is expedient for the converter U2, U3 to contain a memory which stores groups of code characters CW3, CW2 which groups are required to produce respective corresponding groups of character sequences DW3, DW4. Such storage can also take place in the converter U1 if it is known in the transmitting station what character sequences from the generator Z1 are required for each character printed in the receiving station.

If only a part of the characters stored in the character generator Z1 differs from the characters stored in the character generator Z2, it is also possible to transmit mixed messages by transmitting the matching characters by the data words CZ and those characters not stored in the receiving station by means of the code words CW. In this case, several transfer signals may be required with a teleprinter message in order to switch through selectively to the printing head D2 either the character sequences emitted by the character generator Z2 or the character sequences emitted by the converter U3 (DW1, DW3). If each of the characters is represented, for example, in nine character steps which correspond to nine code words CW, under these circumstances the number of teleprinter characters to be transmitted can be considerably reduced using mixed messages, as in the case of the transmission of characters contained in the character generator Z2 only one data word CZ is required in place of the nine code words CW.

The embodiment of the invention described above has the advantage that not only the characters which are stored in the character generator of the receiving station, but also characters which differ from the stored characters, can be printed out in the receiving station. The production of the code words in the transmitting station requires a particularly low expense as the character generator arranged in the transmitting station is used to produce the code words by conversion.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of transmitting printed characters from a transmitting station to a receiving station, comprising the steps of:
   storing binary character sequences at the receiving station in a character generator;
   transmitting data words assigned to the characters from the transmitting station to the receiving station;
   receiving and applying the data words to the character generator to produce printing commands;
   applying the printing commands to a printing head in the receiving station which has at least one printing element;
   storing in a character generator in the transmitting station binary character sequences of characters which at least partially differ from those characters whose binary character sequences are stored in the character generator of the receiving station;
   reading binary character sequences from the character generator in the transmitting station;
   converting the read binary character sequences into code words;
   transmitting the code words in place of the data words from the transmitting station to the receiving station;
   receiving and reconverting the code words into binary character sequences;
   applying the binary character sequences reconverted from the code words to the printing head as printing commands.

2. The method of claim 1, wherein:
   the steps of storing are further defined as storing characters of different alphabets in the transmitting and receiving stations, respectively.

3. The method of claim 1, wherein the step of transmitting is further defined as transmitting, in addition to the code words or data words, switching signals which identify the character sequences to be switched through to the printing head.

4. The method of claim 1, further defined as providing the data words and the code words with a format of teleprinter characters.

5. The method of claim 4, further defined as providing the teleprinter characters in accordance with the CCITT code No. 5.

6. Apparatus for selectively transmitting messages in first and second codes corresponding to first and second languages, comprising:
   a transmitter for receiving words in parallel form and transmitting messages including the words in serial form;
   receiving means for receiving parallel-oriented data words corresponding to characters in a first language;
   storage means storing character sequences of characters in a second language and operable in response to data words to produce parallel-oriented code words corresponding to characters in the second language; and
   switching means connected to said transmitter, to said receiving means and to said storage means, and selectively operable to connect said receiving means directly to said transmitter in one mode and via said storage means in another mode.

7. The apparatus of claim 6, wherein said switching means includes means for inserting a mode transfer signal in the messages applied to said transmitter to indicate the language being transmitted.

8. Apparatus for receiving printer signals and operating a printer, comprising:
   receiving means for receiving first and second messages, said first messages including data words corresponding to characters of a first language and said second messages including code words corresponding to characters of another language;
   a converter for converting code words into comparable data words; and
   means responsive to said first messages to directly operate the printer and responsive to said second messages to operate said printer via said converter.

9. A system for transmitting printed characters, comprising:
   a transmitting station;
   a receiving station;
   means for storing binary character sequences at the receiving station in a character generator;
   means for transmitting data words assigned to the characters from the transmitting station to the receiving station;
   means for receiving and applying the data words to the character generator to produce printing commands;
   means for applying the printing commands to a printing head in the receiving station which has at least one printing element;
   means for storing in a character generator in the transmitting station binary character sequences of characters which at least partially differ from those characters whose binary character sequences are stored in the character generator of the receiving station;
   means for reading binary character sequences from the character generator in the transmitting station;
   means for converting the read binary character sequences into code words;
   means for transmitting the code words in place of the data words from the transmitting station to the receiving station;
   means for receiving and reconverting the code words into binary character sequences;
   means for applying the binary character sequences reconverted from the code words to the printing head as printing commands.

10. The system of claim 9, wherein:
    said means for storing, located in said receiving station, includes a memory for storing binary character sequences respectively corresponding to groups of received code words and to characters stored in the storage means of said receiving station, said storage means including a character generator.

11. The system of claim 9, wherein said receiving station includes a further memory for storing received code words.

12. A system for printed character transmission, comprising:
   a printing head;
   means for storing data words representing a first set of character sequences for operating said printing head in accordance with a first mode;
   means for producing code words representing a second set of character sequences different from said first set and for operating said printing head in accordance with a second mode;
   means for transmitting messages including code word messages and data word messages;
   means responsive to said messages to selectively operate said printing head in accordance with said first and second modes.

* * * * *